United States Patent
Zhang et al.

(10) Patent No.: US 12,461,018 B2
(45) Date of Patent: Nov. 4, 2025

(54) OPTICAL DETECTION APPARATUS FOR DETECTING DISPLAY PANEL AND METHOD FOR DETECTING DISPLAY PANEL

(71) Applicant: BOE Technology Group Co., Ltd., Beijing (CN)

(72) Inventors: Chenyang Zhang, Beijing (CN); Fuqiang Li, Beijing (CN); Meili Wang, Beijing (CN); Lei Wang, Beijing (CN); Xuan Feng, Beijing (CN); Xuan Liang, Beijing (CN); Fei Wang, Beijing (CN); Xinxin Zhao, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 863 days.

(21) Appl. No.: 17/588,305

(22) Filed: Jan. 30, 2022

(65) Prior Publication Data
US 2022/0317024 A1    Oct. 6, 2022

(30) Foreign Application Priority Data
Mar. 31, 2021    (CN) .......................... 202110349346.2

(51) Int. Cl.
*G01N 21/17*    (2006.01)
*H10F 39/15*    (2025.01)
*H10F 39/18*    (2025.01)

(52) U.S. Cl.
CPC ............ *G01N 21/17* (2013.01); *H10F 39/15* (2025.01); *H10F 39/18* (2025.01); *G01N 2021/1772* (2013.01)

(58) Field of Classification Search
CPC ........... G01N 2021/1772; G01N 21/17; H10F 39/15; H10F 39/18
See application file for complete search history.

(56) References Cited

U.S. PATENT DOCUMENTS

| | | | |
|---|---|---|---|
| 10,009,605 B1 * | 6/2018 | Yin ......................... | G01J 3/465 |
| 2006/0072029 A1 | 4/2006 | Miyatake et al. | |
| 2006/0146154 A1 | 7/2006 | Angal et al. | |

FOREIGN PATENT DOCUMENTS

| | | | | |
|---|---|---|---|---|
| CN | 105263396 A | | 1/2016 | |
| CN | 109844766 A | | 6/2019 | |
| CN | 110874586 B | * | 6/2023 | ........... G06K 9/0004 |
| JP | S57141178 A | | 9/1982 | |
| JP | 2004186176 A | | 7/2004 | |
| WO | WO-2019041634 A1 | * | 3/2019 | ............. G01N 21/95 |

OTHER PUBLICATIONS

CN202110349346.2 first office action dated Nov. 28, 2024.

\* cited by examiner

*Primary Examiner* — Tri T Ton
(74) *Attorney, Agent, or Firm* — IPro, PLLC

(57) ABSTRACT

An optical detection apparatus and method for detecting a display panel is provided. The apparatus includes photosensitive units arranged in an array. A minimum distance between adjacent photosensitive units is less than a sub-pixel size of the display panel; the photosensitive units in adjacent rows have a position offset in a first direction; and an offset distance corresponding to the position offset is less than the sub-pixel size of the display panel.

19 Claims, 9 Drawing Sheets

100

OPTICAL DETECTION APPARATUS FOR DETECTING DISPLAY PANEL AND METHOD FOR DETECTING DISPLAY PANEL

CROSS-REFERENCE TO RELATED APPLICATION

This application claims priority to Chinese Patent Application No. 202110349346.2, filed on Mar. 31, 2021 and entitled "OPTICAL DETECTION APPARATUS AND METHOD FOR DETECTING DISPLAY PANEL", the disclosure of which is incorporated herein by reference in its entirety.

TECHNICAL FIELD

The present disclosure relates to the field of display technologies, and in particular, relates to an optical detection apparatus for detecting a display panel and a method for detecting a display panel.

BACKGROUND

Optical detection is an indispensable detection procedure in the production process of display screens. A common optical detection device consists of photosensitive devices such as charge coupled device (CCD), complementary metal oxide semiconductor (CMOS), and photo diode (PD). However, limited by the process of photosensitive devices and the size of drive circuits, the minimum size of a single photosensitive device is limited to some extent. The size of the photosensitive device determines the minimum resolution of the optical detection device. The greater the minimum resolution, the lower the detection accuracy for details, morphology and the like of an object. That is, the detection accuracy of optical detection is largely affected by the size of the photosensitive device.

SUMMARY

Embodiments of the present disclosure provide an optical detection apparatus for detecting a display panel and a method for detecting a display panel.

According to a first aspect of the embodiments of the present disclosure, an optical detection apparatus for detecting a display panel is provided. The optical detection apparatus includes photosensitive units arranged in an array, wherein a minimum distance between adjacent photosensitive units is less than a sub-pixel size of the display panel, and the photosensitive units in adjacent rows have a position offset in a first direction; an offset distance corresponding to the position offset is less than the sub-pixel size of the display panel.

According to a second aspect of the embodiments of the present disclosure, a method for detecting a display panel by using an optical detection apparatus is provided. The method includes: determining a movement route of the display panel based on a size relationship between the optical detection apparatus and the display panel; controlling the optical detection apparatus to acquire screen information of the display panel at a first position; controlling the display panel to move along the movement route, and controlling the optical detection apparatus to acquire the screen information of the display panel again every time the display panel moves a first distance, until the respective acquired screen information collectively embodies a complete screen of the display panel; and performing optical detection on the display panel based on each of the acquired screen information.

According to a third aspect of the embodiments of the present disclosure, a computer device is provided. The computer device includes a processor and a memory, wherein the memory stores a software program, which is loaded and executed by the processor to perform the method as defined in the second aspect.

According to a fourth aspect of the embodiments of the present disclosure, a computer-readable storage medium is provided. The computer-readable storage medium stores at least one program code therein, wherein the at least one program code is loaded and executed by a processor to perform the method as defined in the second aspect.

According to a fifth aspect of the embodiments of the present disclosure, a computer program is provided. The computer program includes: at least one computer program code, wherein the at least one program code includes instructions for performing the method as defined in the second aspect.

BRIEF DESCRIPTION OF THE DRAWINGS

To describe the technical solutions in the present disclosure more clearly, the following briefly introduces the accompanying drawings required for describing the embodiments or the related art. Apparently, the accompanying drawings in the following description show merely some embodiments of the present disclosure, and persons of ordinary skills in the art may still derive other drawings from these accompanying drawings without creative efforts.

DETAILED DESCRIPTION

Figure 1:
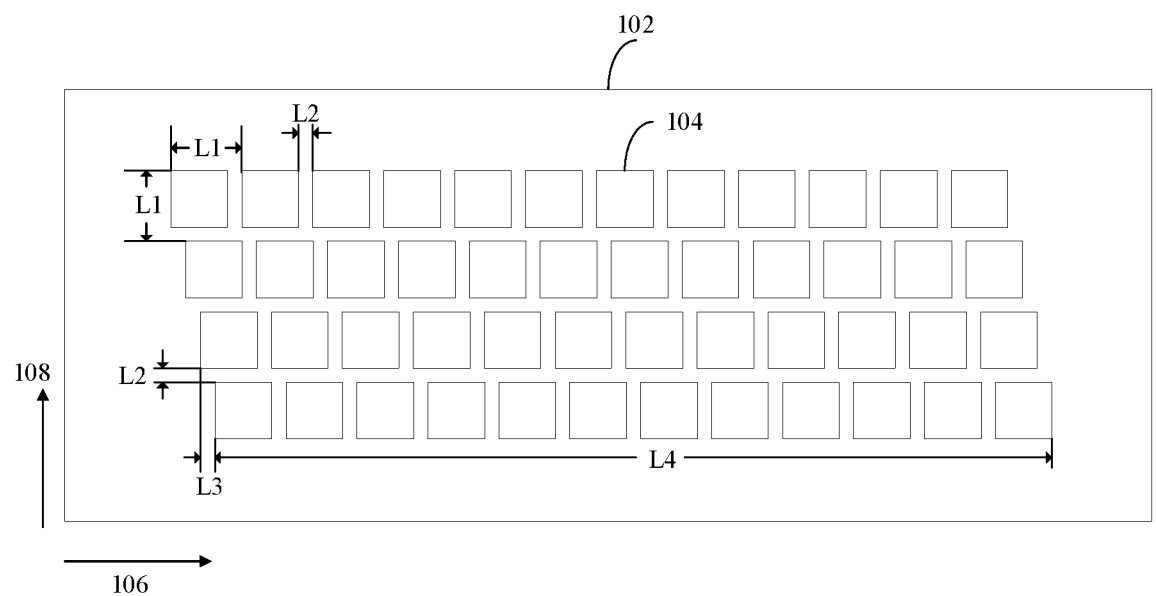
FIG. 1 shows a schematic diagram of an exemplary structure of an optical detection apparatus 100 according to an embodiment of the present disclosure.

For clearer descriptions of the objectives, technical solutions, and advantages of the present disclosure, the embodiments of the present disclosure are described in detail hereinafter with reference to the accompanying drawings.

It should be noted that, unless otherwise defined, the technical terms or scientific terms used in the embodiments of the present disclosure have the ordinary meanings as understood by those of ordinary skills in the art to which the present disclosure belongs. The terms "first", "second", and the like used in the embodiments of the present disclosure do not denote any order, quantity, or significance, and are merely used for distinguishing different components. The terms "comprise", "include", or the like are intended to mean that the element or object appearing before said term covers the elements or objects or equivalents listed after said term, but do not exclude other elements or objects. The terms "connect". "couple", or the like are not limited to physical or mechanical connections, but may include electrical connections, regardless of direct or indirect connections. The terms "upper", "lower", "left", "right", or the like are only used to indicate the relative positional relationship, and when the absolute position of a described object changes, the relative positional relationship may also change accordingly.

In some scenarios, a display panel consists of a huge amount of micro light emitting diodes (Micro LEDs) in large area transferred to a glass-based backplate. To ensure the display effect, it is necessary to perform full backplate detection on such a display panel, and the detection accuracy shall reach 1 micron (μm) or even less. However, limited by the process of photosensitive devices and the size of drive circuits, the minimum size of a single photosensitive device is limited to some extent. As a result, the minimum accuracy of common area-array cameras and line-array cameras is usually with the size of several microns (μm). To achieve the detection accuracy of less than 1 μm, a magnifying lens is required. However, due to the limitation of the field of view (FOV) of an optical system, the magnifying lens requires to take a long time to take a large number of photos to implement full backplate detection, which cannot meet the demand for mass production.

In view of this, the embodiments of the present disclosure provide an optical detection apparatus and method for detecting a display panel. The apparatus includes photosensitive units arranged in an array. A minimum distance between adjacent photosensitive units is less than a sub-pixel size of the display panel; the photosensitive units in adjacent rows have a position offset in a first direction; and an offset distance corresponding to the position offset is less than the sub-pixel size of the display panel. The method includes: determining a movement route of the display panel based on a size relationship between the optical detection apparatus and the display panel; controlling the optical detection apparatus to acquire screen information of the display panel at a first position; controlling the display panel to move along the moving route, and controlling the optical detection apparatus to acquire the screen information of the display panel again every time the display panel moves for a first distance, until all the acquired screen information collectively embodies a complete screen of the display panel; and performing optical detection on the display panel based on the acquired screen information.

As compared with conventional devices such as line-array cameras, the optical detection apparatus and method for detecting the display panel according to the embodiments of the present disclosure can implement the optical detection with sub-pixel accuracy.

FIG. 1 shows a schematic diagram of an exemplary structure of an optical detection apparatus 100 according to an embodiment of the present disclosure.

As shown in FIG. 1, the optical detection apparatus 100 may include a substrate 102 and photosensitive units 104 arranged in an array on the substrate 102.

In some embodiments, as shown in FIG. 1, a minimum distance L2 between adjacent photosensitive units 104 is less than a sub-pixel size (for example, a side length or a diameter of a sub-pixel) of a display panel to be detected, such that the arrangement of the photosensitive units 104 is compact, which is helpful to improve the detection accuracy. In some embodiments, as shown in FIG. 1, the adjacent photosensitive units may be photosensitive units 104 that are adjacent in a first direction 106 and photosensitive units 104 that are adjacent in a second direction 108. The first direction 106 and the second direction 108 are perpendicular to each other. For example, as shown in FIG. 1, the first direction 106 may be a row direction of the photosensitive units 104 arranged in an array, and the second direction 108 may be a column direction of the photosensitive units 104 arranged in an array. Hence, as shown in FIG. 1, in this embodiment, the photosensitive units 104 are rectangular, and the minimum distance L2 between the adjacent photosensitive units 104 may be the distance between opposite sides of the adjacent photosensitive units 104 in the row direction and in the column direction.

In some embodiments, as shown in FIG. 1, the photosensitive units 104 in adjacent rows have a position offset in the first direction 106, and an offset distance L3 corresponding to the position offset is less than the sub-pixel size of the display panel to be detected. In this way, when the optical detection apparatus 100 moves along the second direction 108, due to the offset less than the sub-pixel size between the adjacent rows of photosensitive units, there is an offset with an offset distance L3 in a detection region of the photosensitive unit when an adjacent row of photosensitive units moves to the position of the current row. Therefore, the detection accuracy at a sub-pixel level may be achieved in the first direction 106 based on the offset distance L3. That is, the detection accuracy may reach the sub-pixel level, for example, 1 μm.

Generally, one pixel of the display panel consists of sub-pixels of a variety of colors (for example, red sub-pixels, blue sub-pixels, green sub-pixels, etc.), such that a single pixel may be lighted in full colors. Therefore, it is to be understood that the sub-pixel size is a general size of the sub-pixel, generally micron size, for example, less than or equal to 1 μm.

In some embodiments, as shown in FIG. 1, the pitch L1 between adjacent photosensitive units 104 may be N times the minimum distance L2 between the adjacent photosensitive units 104, and N may be an integer greater than or equal to 2. In this way, when moving along the first direction 106 or the second direction 108, the photosensitive units 104 may move with a unit movement distance of the distance L2, such that a length of one L1 may be repeated after moving N times, thereby achieving the detection accuracy of L1/N in the moving direction. In some embodiments, the pitch L1 may be the distance between center points of the adjacent photosensitive units 104. In an exemplary embodiment, the center point of the rectangular photosensitive unit 104 is an intersection point of diagonal lines.

In some embodiments, as shown in FIG. 1, the pitch L1 between the adjacent photosensitive units 104 may be M times the offset distance L3, and M may be an integer greater than or equal to 2. In this way, in the case that the optical detection apparatus 100 moves along the second direction 108 with a unit movement distance of the offset distance L3, the length of one L1 may be repeated after M times of movement, thereby achieving the detection accuracy of L1/M in the first direction 106.

In some embodiments, for ease of detection, as shown in FIG. 1, the length and width of the photosensitive unit 104 may be equal, and the minimum distance L2 and the offset distance L3 between the adjacent photosensitive units 104 may be equal. Accordingly, N and M in the foregoing embodiment may also be equal. In some embodiments, the sizes of all the photosensitive units 104 are the same, and the length and width of each of the photosensitive units 104 are equal. That is, the photosensitive units 104 are square, and any two of the photosensitive units 104 are of the same side length.

In some embodiments, as shown in FIG. 1, a length L4 of one row of photosensitive units 104 is greater than a length of at least one side of the display panel to be detected. For example, in the case that the length L4 is greater than the length of a long side of the display panel, the entire display panel may be covered by moving the optical detection apparatus 100 along a short-side direction of the display panel for a certain number of times, such that a complete screen of the display panel may be acquired. In this way, the complete screen of the display panel may be acquired without moving the optical detection apparatus 100 along a long-side direction of the display panel. In other words, the complete screen of the display panel may be acquired, that is, the full substrate detection can be achieved, by moving the optical detection apparatus 100 along one direction In some embodiments, the length L4 of one row of photosensitive units 104 may be at least greater than a sum of the length of at least one side of the display panel to be detected and the pitch L1 between adjacent photosensitive units 104. In this way, when an initial relative position between the display panel and the photosensitive unit array is appropriate, each row of photosensitive units may cover peripheries at both sides of the display panel to be detected during the process that the display panel moves along a straight line, such that more abundant optical data may be acquired for better calculating a detection result.

Figure 2:
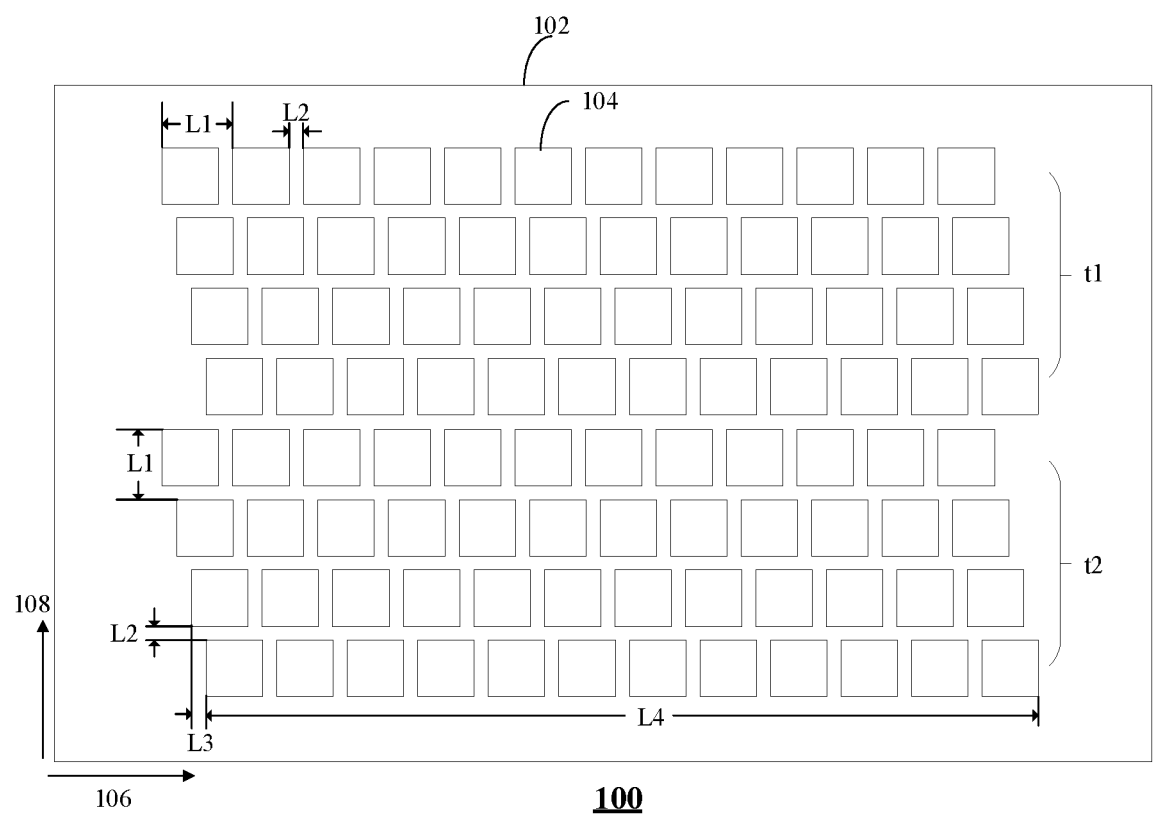
FIG. 2 shows a schematic diagram of another exemplary structure of the optical detection apparatus 100 according to an embodiment of the present disclosure.

FIG. 2 shows a schematic diagram of another exemplary structure of an optical detection apparatus 100 according to an embodiment of the present disclosure. As shown in FIG. 2, in some embodiments, n adjacent rows of photosensitive units 104 may be taken as a group, and each group of photosensitive units 104 is arranged side by side along the second direction 108. By increasing the number of the photosensitive units, the detection region of the optical detection apparatus 100 is larger, such that the number of movements may be reduced, and the detection efficiency is improved.

In some embodiments, n is an integer greater than or equal to 2. In one group of photosensitive units 104, the photosensitive units 104 in adjacent rows have the position offset L3 in the first direction 106, and the photosensitive units 104 in adjacent groups have no relative position offset on the whole. For example, as shown in FIG. 2, the optical detection apparatus 100 includes a photosensitive unit group t1 and a photosensitive unit group 2. The photosensitive unit group t1 and the photosensitive unit group t2 are arranged side by side, and have no relative position offset on the whole. That is, the corresponding rows in the respective groups are aligned. That is, the corresponding rows in the respective groups of photosensitive units are at the same initial position. As shown in FIG. 2, a first row in the photosensitive unit group t1 and a first row in the photosensitive unit group t2 are aligned. Similarly, as shown in FIG. 2, other corresponding rows in the respective groups are also aligned. The photosensitive units in corresponding rows in respective groups of photosensitive units are at the same position in the first direction.

Figure 3:
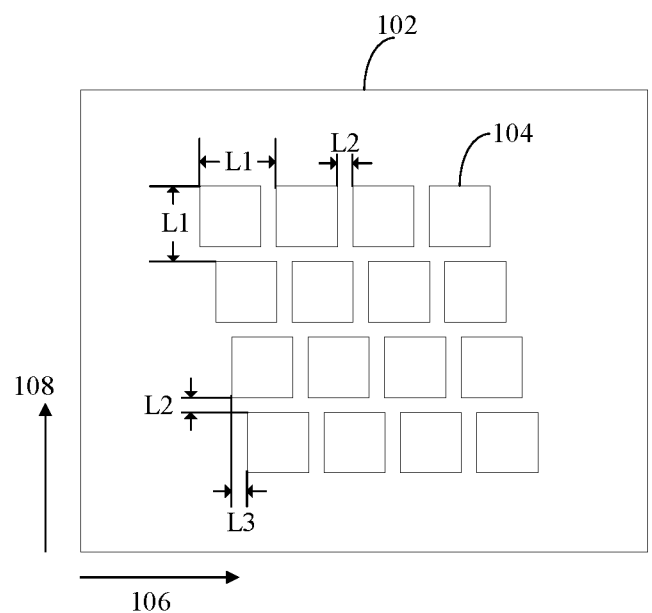
FIG. 3 shows a schematic diagram of still another exemplary structure of the optical detection apparatus 100 according to an embodiment of the present disclosure.

In some embodiments, the optical detection apparatus 100 may be made smaller to improve portability. FIG. 3 shows a schematic diagram of still another exemplary structure of an optical detection apparatus 100 according to an embodiment of the present disclosure. As shown in FIG. 3, the optical detection apparatus 100 includes a 4×4 photosensitive unit array. The optical detection apparatus 100 cannot cover any side of the display panel to be detected in terms of length and width. Therefore, when the display panel is detected, an S-shaped reciprocating route is needs to be taken to complete the detection of the entire display panel.

It can be understood that under the structural design of the optical detection apparatus 100 according to the embodiments of the present disclosure, the detection accuracy of the photosensitive units 104 per se may achieve several microns. Therefore, common optical photosensitive devices may be used as the photosensitive units 104 in the optical detection apparatus 100. For example, the photosensitive unit 104 may be a photo diode (PD) optical sensor, a charge coupled device (CCD) image sensor, or a complementary metal oxide semiconductor (CMOS) image sensor.

Figure 4:
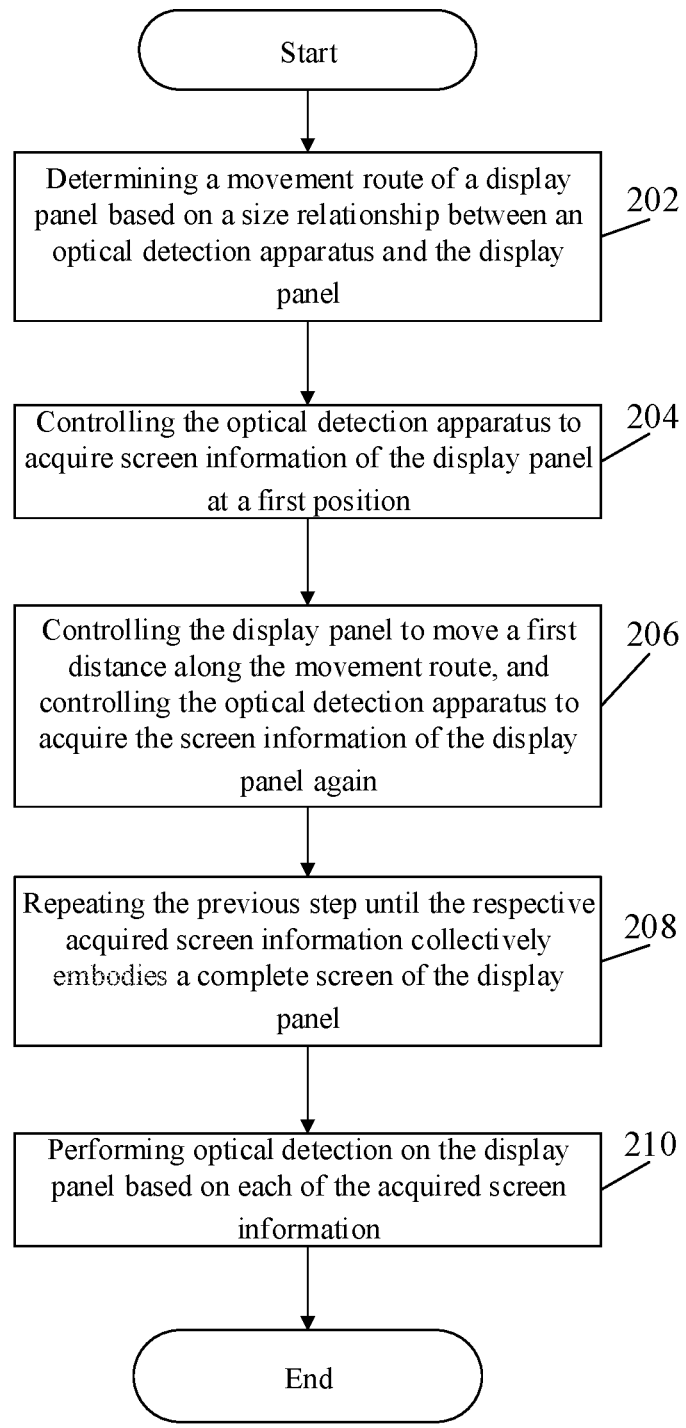
FIG. 4 shows a schematic flowchart of an exemplary method according to an embodiment of the present disclosure.

FIG. 4 shows a schematic flowchart of an exemplary method 200 according to an embodiment of the present disclosure.

As shown in FIG. 4, in the method 200, any embodiment of or any arrangement or combination of the embodiments of the foregoing optical detection apparatus 100 may be utilized to detect a display panel. The method 200 may include the following steps.

In step 202, a movement route of the display panel may be determined first based on a size relationship (or a size proportional relationship) between the optical detection apparatus 100 and the display panel to be detected.

Since the display panel is in various sizes, and the size of the optical detection apparatus 100 is generally fixed, the optical detection apparatus 100 may not match the display panel.

For example, the length LA of one row of photosensitive units 104 in the optical detection apparatus 100 shown in FIGS. 1 and 2 is greater than the length of the display panel, and thus the display panel may move along a straight line in only one direction during detection. For another example, the length of one row of photosensitive units 104 in the optical detection apparatus 100 shown in FIG. 3 may be less than the length of the display panel and the width of the display panel, and thus the display panel needs to take reciprocating movement in an S-shaped route during detection.

Therefore, in some embodiments, step 202 may further include the following.

If the length of one row of photosensitive units 104 in the optical detection apparatus 100 is greater than the length of a first side of the display panel to be detected, the display panel moves in a straight line along an extension direction of a second side of the display panel. The first side and the second side are perpendicular to each other.

Figure 5:
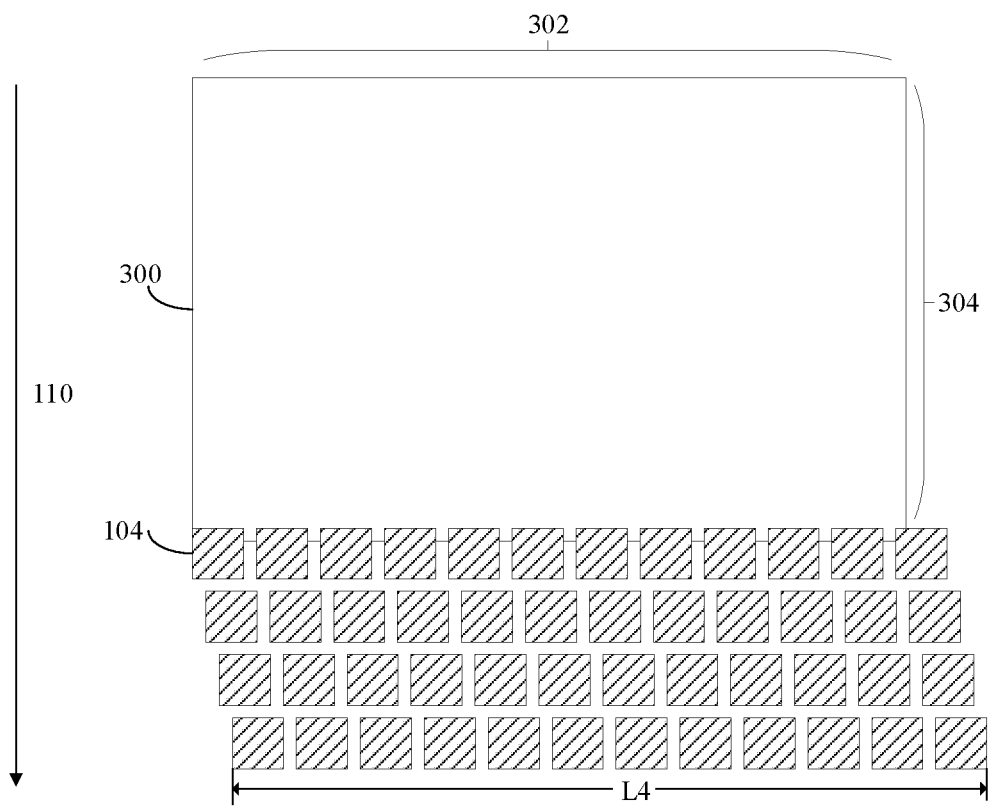
FIG. 5 shows an exemplary schematic diagram of optical detection performed on a display panel by an optical detection apparatus according to an embodiment of the present disclosure.

FIG. 5 shows an exemplary schematic diagram of optical detection performed on a display panel 300 by an optical detection apparatus 100 according to an embodiment of the present disclosure. As shown in FIG. 5, the length LA of one row of photosensitive units 104 in the optical detection apparatus 100 is greater than or equal to the length of a long side 302 of the display panel 300. Therefore, the display panel 300 may take a linear movement along a route 110 along an extension direction of a short side 304 of the display panel 300.

If the length of one row of photosensitive units 104 in the optical detection apparatus 100 is less than the length of any side of the display panel 300, the movement route is an S-shaped route. The starting point of the S-shaped route is a position of the display panel when a first corner of the display panel is covered by the optical detection apparatus 100, and the ending point of the S-shaped route is a position of the display panel when a second corner of the display panel is covered by the optical detection apparatus 100. The first corner and the second corner are two different corners of the display panel.

Figure 11:
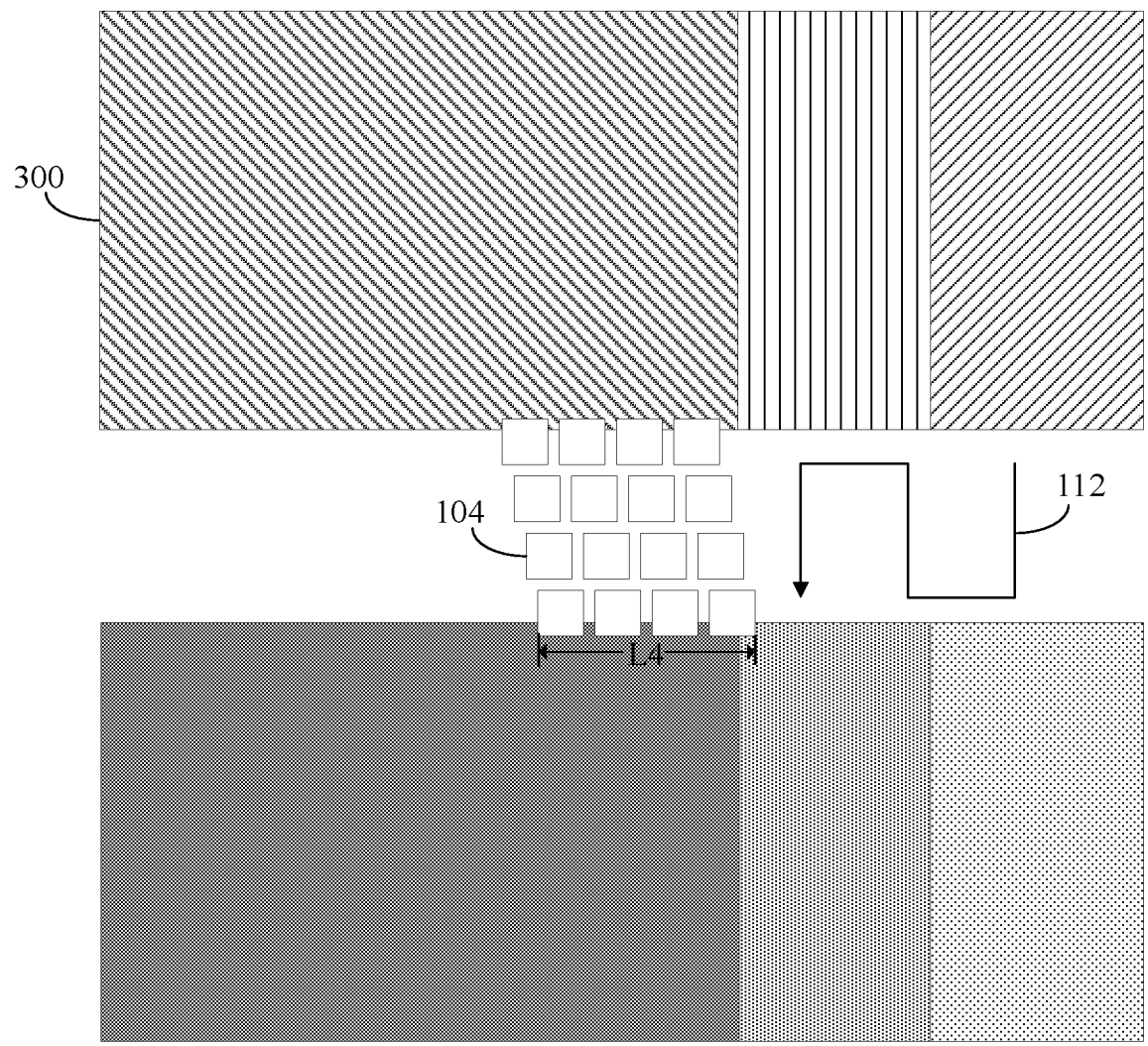
FIG. 11 shows yet another exemplary schematic diagram of optical detection performed on a display panel by an optical detection apparatus according to an embodiment of the present disclosure.

FIG. 11 shows another exemplary schematic diagram of optical detection performed on a display panel 300 by an optical detection apparatus 100 according to an embodiment of the present disclosure. As shown in FIG. 11, the length L4 of one row of photosensitive units 104 in the optical detection apparatus 100 is less than the length of the long side 302 of the display panel 300 and less than the length of the short side 304 of the display panel 300. Therefore, the movement route of the display panel 300 may be an S-shaped route 112. As shown in FIG. 11, a starting point of the S-shaped route may be a position of the display panel 300 when a first corner (the lower left corner of the display panel 300 in FIG. 11) of the display panel 300 is covered by the optical detection apparatus 100, and an ending point of the S-shaped route may be a position of the display panel 300 when a second corner (the upper right corner of the display panel 300 in FIG. 11) of the display panel 300 is covered by the optical detection apparatus 100.

It can be understood that the first corner and the second corner of the display panel 300 may be any two different corners of the display panel 300. For example, a connecting line between the first corner and the second corner may be on a diagonal line of the display panel 300, as shown in FIG. 11. In some cases, based on the difference in size, the connecting line between the first corner and the second corner may also be parallel to the long side 302 or the short side 304 of the display panel 300.

In step 204, the optical detection apparatus 100 may be controlled to acquire screen information of the display panel 300 at a first position.

For example, in FIG. 5, one of the long sides of the display panel 300 is the first position. For another example, in FIG. 11, the extreme edge of one of the long sides of the display panel 300 is the first position. It can be understood that the first position may be different depending on different movement routes. For example, in the example of FIG. 5, one of the short sides of the display panel 300 may also be taken as the first position for the optical detection apparatus 100 to acquire screens. In this embodiment, the display panel 300 needs to move a longer distance. For another example, in the example of FIG. 11, the position of the extreme edge of one of the short sides of the display panel 300 may also be taken as the first position for the optical detection apparatus 100 to acquire screens. Accordingly, the S-shaped movement route and the movement route 112 may be different, but may be basically the same in movement distance.

In step 206, the display panel 300 may be controlled to move a first distance along the movement route, and the screen information of the display panel 300 may be acquired again.

Figure 6:
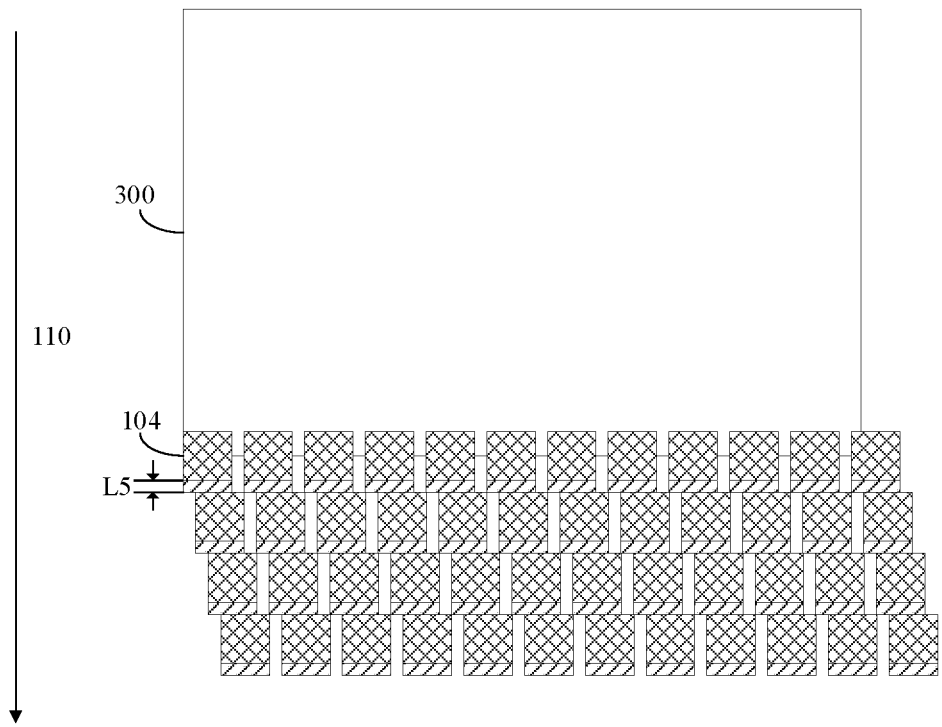
FIG. 6 shows another exemplary schematic diagram of optical detection performed on a display panel by an optical detection apparatus according to an embodiment of the present disclosure.
Figure 7:
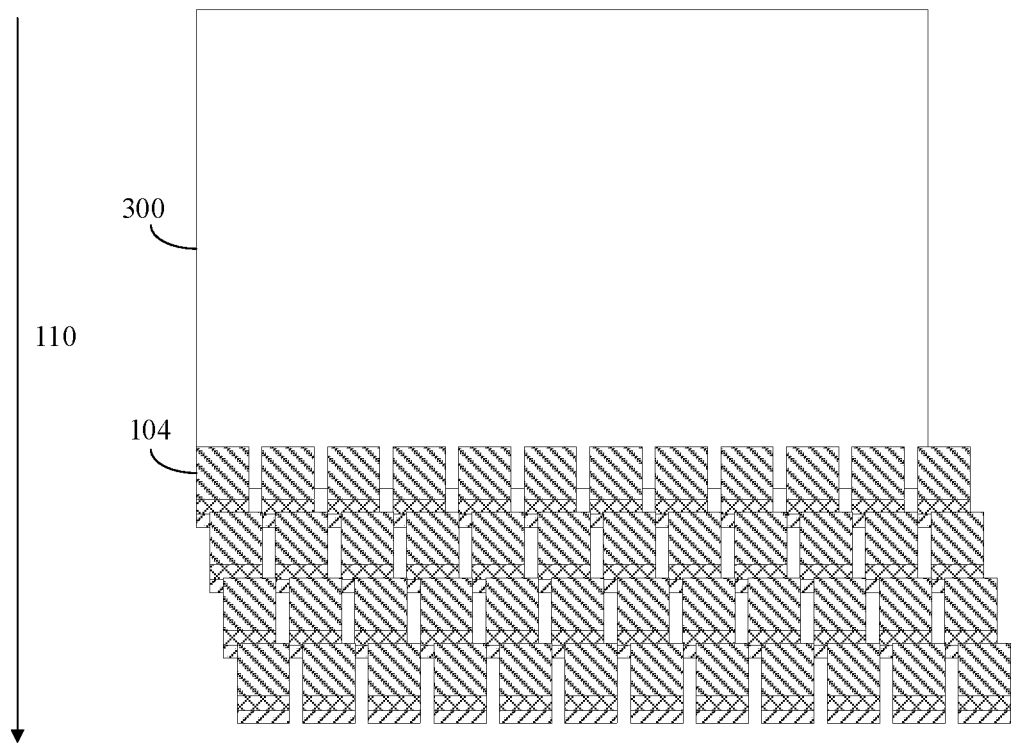
FIG. 7 shows still another exemplary schematic diagram of optical detection performed on a display panel by an optical detection apparatus according to an embodiment of the present disclosure.
Figure 8:
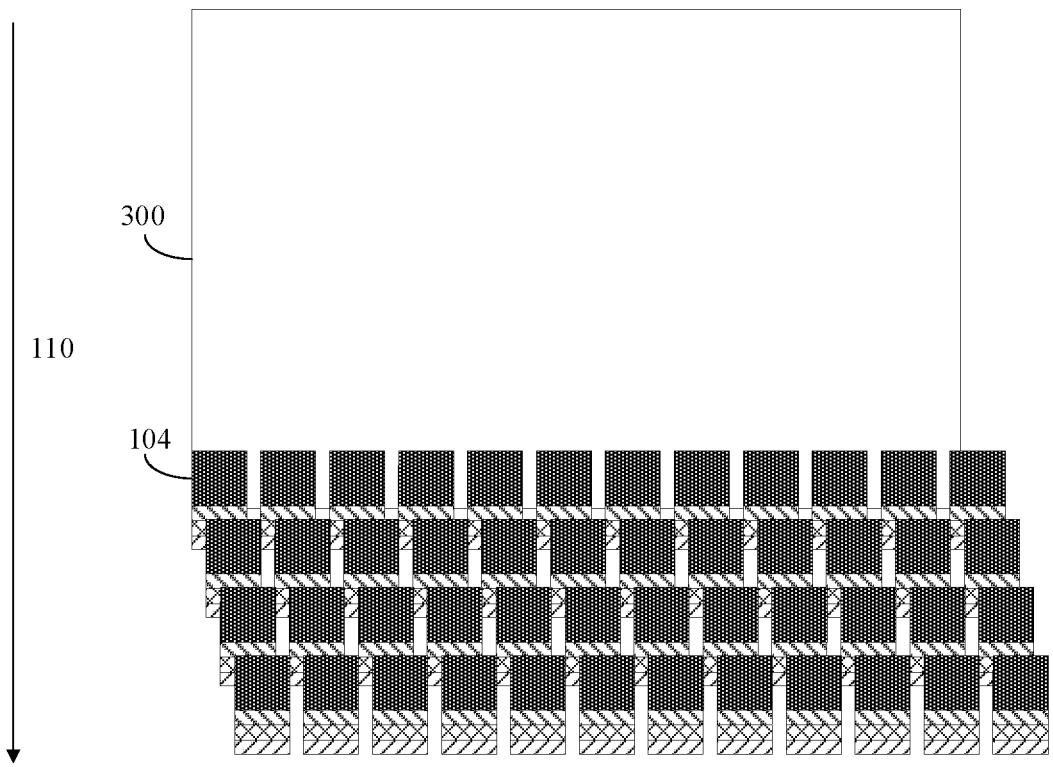
FIG. 8 shows yet another exemplary schematic diagram of optical detection performed on the display panel by an optical detection apparatus according to an embodiment of the present disclosure.
Figure 9:
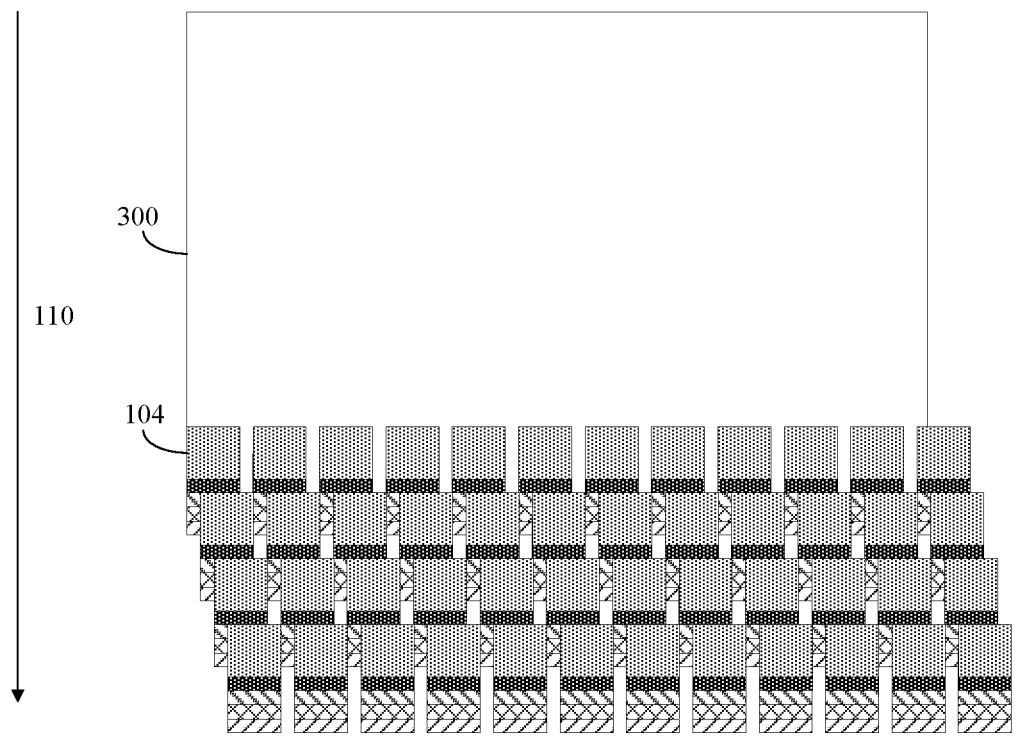
FIG. 9 shows yet another exemplary schematic diagram of optical detection performed on a display panel by an optical detection apparatus according to an embodiment of the present disclosure.

FIG. 6 shows another exemplary schematic diagram of optical detection performed on a display panel 300 by an optical detection apparatus 100 according to an embodiment of the present disclosure. In FIG. 6, the photosensitive unit 104 filled with a different pattern is used to represent the relative position between the photosensitive unit 104 and the display panel 300 at different moments. It can be seen that in FIG. 6, the display panel 300 may move a distance L5 along the movement route 110, and the optical detection apparatus 100 may acquire the screen information of the display panel 300 again. The distance L5 may also be less than the sub-pixel size of the display panel 300. For example, the distance L5 may be equal to the distance L2 between opposite sides of the photosensitive units 104, or equal to the offset distance L3 between the photosensitive units 104 in adjacent rows.

In step 208, the previous step 206 may be repeated until all the acquired screen information collectively embodies the complete screen of the display panel 300.

That is, the display panel is controlled to move along the movement route, and the optical detection apparatus is controlled to acquire the screen information of the display panel again every time the display panel moves a first distance, until all the acquired screen information collectively embodies the complete screen of the display panel.

FIGS. 7 to 10 show a plurality of exemplary schematic diagrams of optical detection performed on a display panel 300 by an optical detection apparatus 100 according to embodiments of the present disclosure. In FIGS. 7 to 10, the photosensitive units 104 filled with different patterns are used to represent the relative position between the photosensitive unit 104 and the display panel 300 at different moments.

Figure 10:
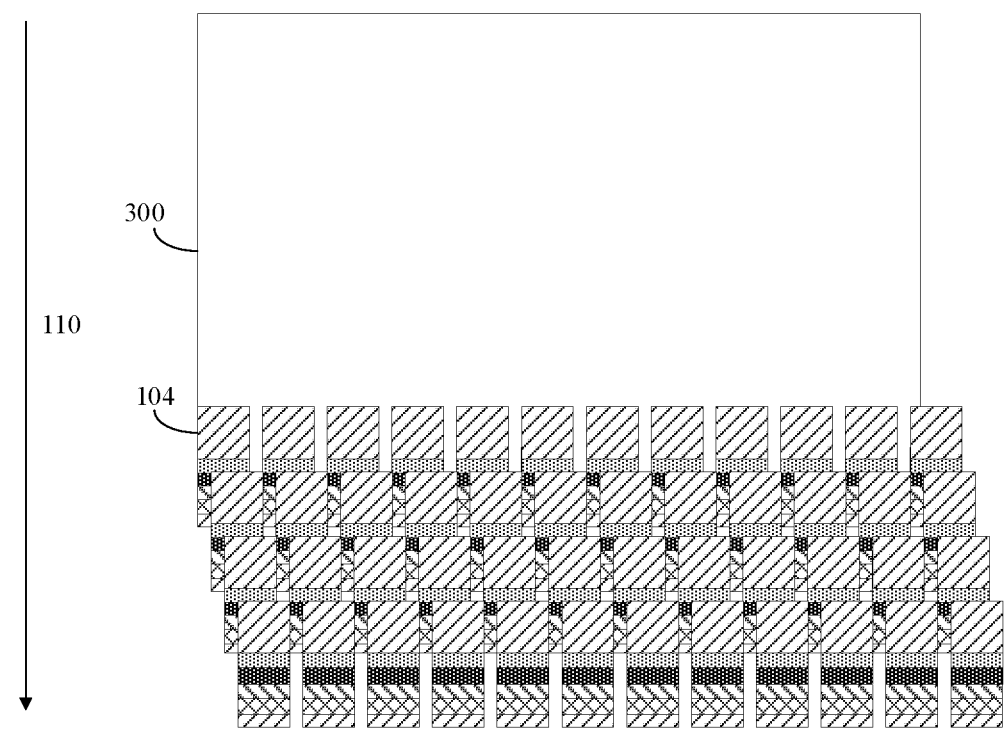
FIG. 10 shows yet another exemplary schematic diagram of optical detection performed on a display panel by an optical detection apparatus according to an embodiment of the present disclosure.

It can be seen that from FIG. 7 to FIG. 10, the display panel 300 moves a distance L5 along the movement route 110 each time, and the optical detection apparatus 100 acquires the screen information of the display panel 300 at that position accordingly. After multiple steps of movement and acquisition of screen information, all of the screen information acquired may collectively embody the complete screen of the display panel 300. It can also be seen from FIGS. 7 to 10 that when the display panel 300 moves to the position of the photosensitive units 104 in a next row, as shown in FIGS. 5 and 10, due to the offset distance L3, an undetected blank region at the pitch L2 between adjacent photosensitive units 104 in the previous row may be detected by the photosensitive units 104 in the next row, thereby filling the gap of the detection data. In view of this, when the pitch L2 is equal to the offset distance L3, detection gaps can be completely filled.

In some embodiments, when the photosensitive units are CCDs or CMOSs, a transverse resolution (the resolution of CCDs or CMOSs) and a longitudinal resolution (achieved by a stepper motor controlling the movement of the display panel) need to be equal in order to ensure that images acquired by the optical detection apparatus 100 are not stretched or compressed.

The following variables may be set:
1) the number of pixels (unit: pixel) corresponding to each row of photosensitive units 104: Hc;
2) the width (unit: m) of the display panel: Lo;
3) the movement speed (unit: m/s) of the display panel: Vo;
4) the linear scan rate (unit: Hz. i.e., lines/s) of a row of photosensitive units 104: Vc;
5) the running time (unit: s) of the display panel in the case of scanning one frame of image: To; and
6) the scan time (unit: s) of a row of photosensitive units 104 in the case of scanning one frame of image: Tc.

In this embodiment of the present disclosure, the transverse resolution is: (Lo/Hc)/m, where m is an increased multiple of the transverse resolution in the embodiment of the present disclosure. For example, m is the ratio (for example, 4) of the side length of the photosensitive unit 104 to the distance L5.

The longitudinal resolution is: (Vo×To)/(Vc×Tc), that is, speed/line value.

It is easy to know To=Tc.

According to the principle of "the transverse resolution is equal to the longitudinal resolution", the following formula is derived:

$$(Lo/Hc)/m = Vo/Vc.$$

Then, the linear scan rate of the photosensitive units 104 is:

$$Vc = Hc \times Vo \times m/Lo.$$

In step 210, optical detection may be performed on the display panel based on each of the acquired screen information.

Figure 12:
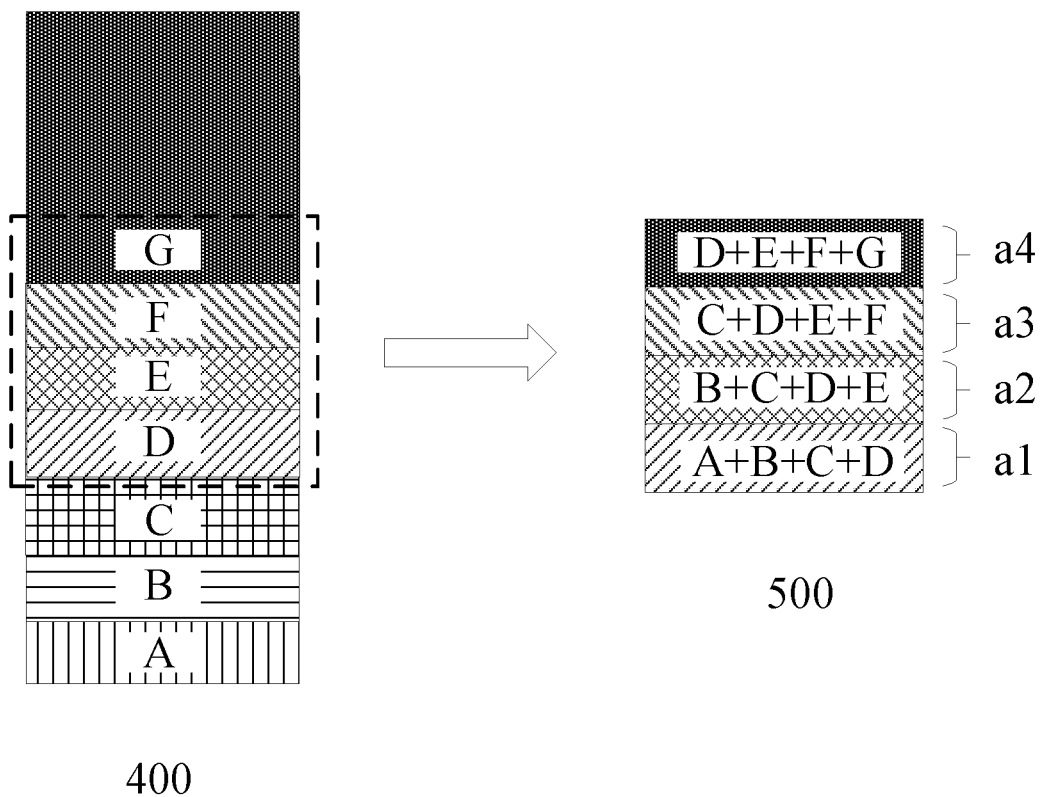
FIG. 12 shows a schematic diagram of distribution of a partial acquisition region and a region therein during a detection process of photosensitive units according to an embodiment of the present disclosure.

FIG. 12 shows a schematic diagram of distribution of a partial acquisition region 400 and a region 500 therein during a detection process of the photosensitive units 104 according to an embodiment of the present disclosure. In FIG. 12, screens acquired by the photosensitive units 104 at different moments are represented by different filling patterns.

As shown in FIG. 12, by taking an example in which the display panel 300 moves relative to one photosensitive unit 104 along the movement route 110, an acquisition region 400 is obtained through multiple acquisition by the photosensitive unit 104 after the display panel 300 moves multiple times. As shown in FIG. 12, the relative positional relationship between the photosensitive unit and the display panel changes from state A to state G sequentially.

In the case that only the display screen acquired by one photosensitive unit in FIG. 12 is processed in the region 500 corresponding to the dashed box of the acquisition region 400, 4 times of acquisition are performed by the photosensitive unit on sub-regions a1, a2, a3, and a4 respectively in the region 500. For example, when the relative positional relationship between the photosensitive unit and the display panel is state A, one acquisition is performed on the sub-region a1; when the relative positional relationship between the photosensitive unit and the display panel is state B, one acquisition is performed on the sub-regions a1 and a2 respectively; when the relative positional relationship between the photosensitive unit and the display panel is state C, one acquisition is performed on the sub-regions a1, a2 and a3 respectively; and when the relative positional relationship between the photosensitive unit and the display panel is state D, one acquisition is performed on the sub-regions a1, a2, a3 and a4 respectively. Thus, in this case, 4 times of acquisition have been performed on the sub-region a1. Therefore, the optical data volume of the sub-region a1 may be calculated based on the data acquired by the photosensitive unit when the relative positional relationship between the photosensitive unit and the display panel is state A, state B, state C and state D.

It can be understood that since the optical detection apparatus 100 includes the photosensitive units arranged in an array, due to the offset distance L3, the pitch L2, and the selection of different initial first positions, it's possible that only one photosensitive unit may acquire data for multiple times in some regions, and many photosensitive units may acquire data for multiple times in some other regions.

Figure 13:
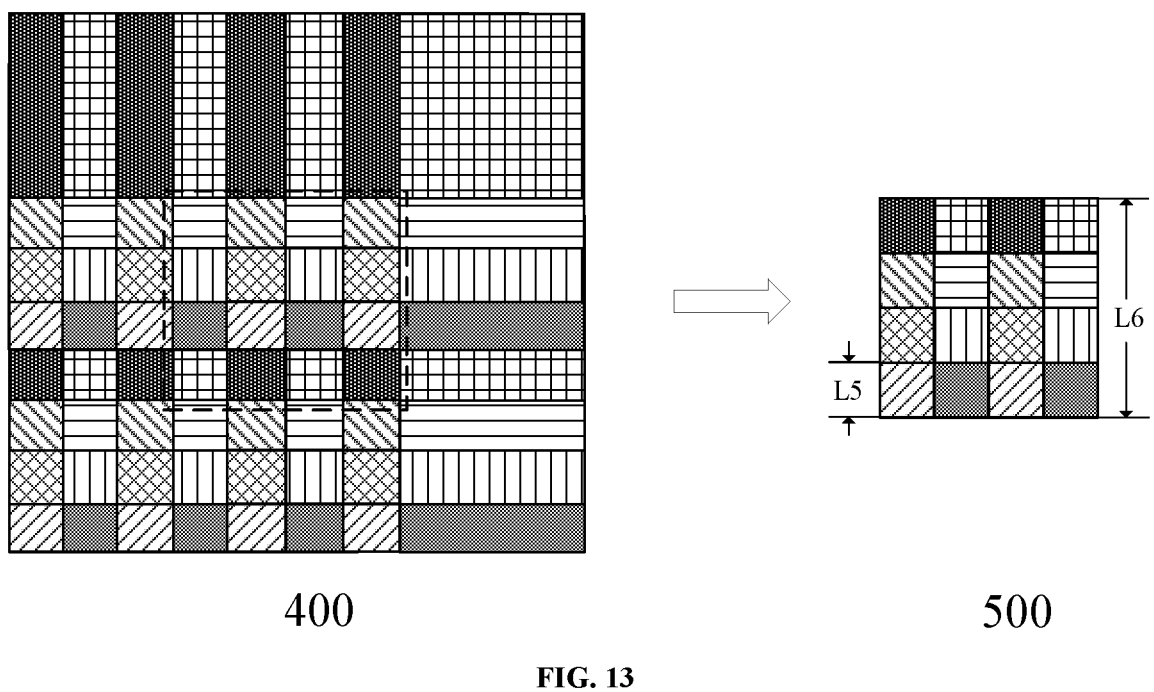
FIG. 13 shows a schematic diagram of another distribution of a partial acquisition region and a region therein during a detection process of photosensitive units according to an embodiment of the present disclosure.

FIG. 13 shows a schematic diagram of another distribution of a partial acquisition region 400 and a region 500 therein during a detection process of the photosensitive units 104 according to an embodiment of the present disclosure. In FIG. 13, screens acquired by the photosensitive units 104 at different moments are represented by different filling patterns.

As shown in FIG. 13, the region 500 corresponding to the dashed box may be further divided into 16 small regions, 4 times of acquisition are performed on each small region by each of 4 photosensitive units, that is, 16 times of acquisition in total are performed on each small region. That is, 16 acquired data (belonging to the 4 photosensitive units) is available for calculating the optical data volume of this small region.

It thus can be seen that, since the acquisition may be performed on the regions of the display panel by different photosensitive units, and the number of acquisitions on different regions is also different, in some embodiments, step 210 may further include the followings.

A corresponding relationship between each of the screen information and the display panel is determined based on each of the acquired screen information. That is, a relationship needs to be established between the data acquired by each of the photosensitive units and a corresponding position of the display panel.

Optical data at a corresponding position of the display panel is calculated in combination with each of the screen information based on the corresponding relationship between each of the screen information and the display panel. That is, after the relationship between the data acquired by each of the photosensitive units and the corresponding position of the display panel is established, the optical data of at the position of the display panel may be calculated based on the data acquired by the corresponding photosensitive unit.

Then, the optical detection on the display panel may be completed based on the optical data at the corresponding position of the display panel. For example, the display panel is determined to have a problem with optical homogeneity if the homogeneity among the calculated optical data of the respective subdivided regions is lower than a predetermined threshold.

In some embodiments, calculating optical data at a corresponding position of the display panel in combination with each of the screen information based on the corresponding relationship between each of the screen information and the display panel may further include: determining the number of subdivided regions of a region corresponding to the data acquired by the photosensitive unit based on the relationship between the first distance and the size of the photosensitive unit; and calculating the optical data at the corresponding position of the display panel in combination with each of the screen information based on the number of the subdivided regions.

Taking FIG. 13 as an example, the ratio of the side length L6 of the photosensitive unit to the first distance L5 is 4:1, and accordingly, the number of subdivided regions of the region 500 corresponding to the data acquired by the photosensitive unit may be 16. In this way, for one subdivided region, the optical data of the photosensitive unit that acquires the screen information of the display panel at a position corresponding to said subdivided region may be divided by the number of subdivided regions (for example, 16), to obtain the optical data acquired in said subdivided region by the photosensitive unit.

It is assumed that i photosensitive units each have performed j times of acquisition on said subdivided region. For example, the optical data acquired by a first photosensitive unit from a first time of acquisition to an $i^{th}$ time of acquisition are k11 to ki1, the optical data acquired by a second photosensitive unit from a first time of acquisition to an $i^{th}$ time of acquisition are k12 to ki2, and so on, and the optical data acquired by a $j^{th}$ photosensitive unit from a first time of acquisition to an $i^{th}$ time of acquisition are k1j to kij. In this way, the optical data of the display panel corresponding to said subdivided region may be obtained by dividing a sum of the optical data obtained through i×j times of acquisition by the photosensitive units by i×j.

For example, taking the ratio of the side length L6 of the photosensitive unit to the first distance L5 being 4:1 as an example, in the case that 4 times of acquisitions have been performed on a subdivided region by each of 4 photosensitive units, the optical data of the display panel corresponding to the subdivided region may be (k11+k21+k31+k41+k12+k22+k32+k42+k13+k23+k33+k43+k14+k24+k34+k44)÷16.

It can be known that, in the embodiments of the present disclosure, the data acquired by each of the photosensitive units may be further subdivided, such that the detection accuracy may reach the sub-pixel level resolution accuracy. Moreover, by adjusting the proportional relationship between the side length of the photosensitive unit and the movement distance of the display panel, the detection accuracy may be further improved.

According to the optical detection apparatus and the method for detecting a display panel according to the embodiments of the present disclosure, the resolution accuracy that is several times less than a detected pixel size, that is, the sub-pixel resolution accuracy can be achieved, as compared with traditional camera detection.

The photosensitive units in the embodiments of the present disclosure may directly act as an optical detection apparatus or may be spliced into an optical detection apparatus of any size. The optical detection apparatus may be applicable to optical sensors to improve the device resolution, or may be applicable to cameras to improve the detection resolution accuracy and image quality. Furthermore, the optical detection apparatus may also be fabricated into an array device of the same size as the display panel, for micro-detection of large-area objects to be detected.

The photosensitive units according to the embodiments of the present disclosure include, but are not limited to, PDs, CCDs, CMOSs and other photosensitive devices. A substrate of the optical detection apparatus according to the embodiments of the present disclosure includes, but is not limited to, a glass substrate, a silicon substrate, a sapphire substrate, and the like.

To implement large-area detection, if the photosensitive units are PDs, a PIN array driven by a glass substrate may be directly fabricated as an optical detection apparatus. If the photosensitive units are silicon-based devices such as CCDs or CMOSs, the photosensitive units may be transferred and spliced on a glass substrate to form an optical detection apparatus of the same size as the display panel.

Figure 14:
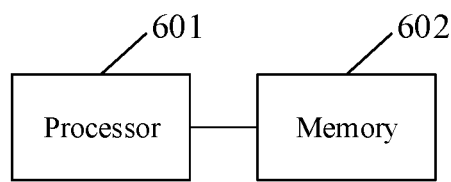
FIG. 14 shows a structural block diagram of a computer device according to an embodiment of the present disclosure.

FIG. 14 is a structural block diagram of a computer device according to an embodiment of the present disclosure. Generally, the computer device includes a processor 601 and a memory 602.

The processor 601 may include one or more processing cores, such as 4-core processors or 8-core processors. The processor 601 may be implemented in at least one of hardware forms including a digital signal processor (DSP), a field-programmable gate array (FPGA), and a programmable logic array (PLA). The processor 601 may further include a main processor and a co-processor. The main processor is configured to process data in an awake state, and is also called as a central processing unit (CPU), and the co-processor is a low-power-consumption processor configured to process data in a standby state.

The memory 602 may include one or more computer-readable storage media, which may be non-transitory. The memory 602 may further include a high-speed random-access memory, and a non-volatile memory, such as one or more magnetic-disk storage devices and flash storage devices. In some embodiments, the non-transitory computer-readable storage medium in the memory 602 is configured to store at least one instruction, which is configured to be executed by the processor 601 for performing the method according to the method embodiments in the present disclosure.

Persons of ordinary skill in the art should understand that the discussion of any of the above embodiments is merely for an exemplary purpose, and is not intended to imply that the scope of the present disclosure (including the claims) is limited to these examples. Under the concept of the present disclosure, the above embodiments or the technical features in different embodiments may also be combined, and the steps may be executed in any order. Moreover, many other variations in different aspects of the embodiments of the present disclosure as described above are possible, but not provided in detail for the sake of brevity.

In addition, for the brevity of description and discussion and in order not to obscure the embodiments of the present disclosure, the well-known power/ground connections to the integrated circuit (IC) chips and other components may or may not be illustrated in the provided drawings. In addition, the apparatus may be illustrated in the form of block diagram in order not to obscure the present disclosure, and in consideration of the fact that the details about the embodiments of the apparatus in block diagram are highly dependent on the platform on which the embodiments of the present disclosure will be implemented (that is, these details should be fully within the understanding of those skilled in the art). In the case where the specific details (for example, the circuits) are set forth to describe the exemplary embodiments of the present disclosure, it is obvious to those skilled in the art that the embodiments of the present disclosure may be implemented without these specific details or with these specific details changed. Therefore, these descriptions should be considered illustrative rather than restrictive.

Although the present disclosure has been described in combination with the specific embodiments of the present disclosure, many substitutions, modifications and variations of these embodiments will be apparent to those of ordinary skill in the art based on the foregoing descriptions. For example, the discussed embodiments may be used in other memory architectures (for example, a dynamic random access memory (DRAM)).

The embodiments of the present disclosure are intended to cover all such substitutions, modifications and variations that fall within the broad scope of the appended claims. Therefore, any omission, modification, equivalent substitution, improvement and the like made within the spirit and principle of the embodiments of the present disclosure shall fall within in the protection scope of the present disclosure.

What is claimed is:

1. An optical detection apparatus for detecting a display panel, comprising photosensitive units arranged in an array, wherein a minimum distance between adjacent photosensitive units is less than a sub-pixel size of the display panel, and the photosensitive units in adjacent rows have a position offset in a first direction, an offset distance corresponding to the position offset being less than the sub-pixel size of the display panel;
wherein a pitch between adjacent photosensitive units is N times the minimum distance between the adjacent photosensitive units, N being an integer greater than or equal to 2; and the pitch between adjacent photosensitive units is an integral multiple of the offset distance, wherein the pitch between the adjacent photosensitive units is a distance between center points of the adjacent photosensitive units.

2. The apparatus according to claim 1, wherein the minimum distance between the adjacent photosensitive units is equal to the offset distance.

3. The apparatus according to claim 2, wherein each of the photosensitive units is square, and any two of the photosensitive units are of a same side length.

4. The apparatus according to claim 1, wherein n adjacent rows of photosensitive units are divided into a group, and the photosensitive units in each group are arranged side by side along a second direction, n being an integer greater than or equal to 2, and the second direction being perpendicular to the first direction; wherein in one group of photosensitive units, the photosensitive units in adjacent rows have the position offset in the first direction, and the photosensitive units in adjacent groups have no relative position offset on the whole.

5. The apparatus according to claim 4, wherein the photosensitive units in corresponding rows in the groups of photosensitive units are at a same position in the first direction.

6. The apparatus according to claim 1, wherein the adjacent photosensitive units comprise at least one of: the photosensitive units adjacent in the first direction, or the photosensitive units adjacent in a second direction.

7. The apparatus according to claim 4, wherein the first direction is a row direction of the photosensitive units arranged in an array, and the second direction is a column direction of the photosensitive units arranged in an array.

8. The apparatus according to claim 1, wherein a length of one row of photosensitive units is greater than a length of at least one side of the display panel.

9. The apparatus according to claim 8, wherein the length of one row of photosensitive units is greater than a sum of the length of at least one side of the display panel and the pitch between adjacent photosensitive units.

10. The apparatus according to claim 1, wherein the photosensitive unit is one of: a photo diode optical sensor, a charge coupled device image sensor, and a complementary metal oxide semiconductor image sensor.

11. A method for detecting a display panel by using an optical detection apparatus, the optical detection apparatus comprising photosensitive units arranged in an array, wherein a minimum distance between adjacent photosensitive units is less than a sub-pixel size of the display panel, and the photosensitive units in adjacent rows have a position offset in a first direction, an offset distance corresponding to the position offset being less than the sub-pixel size of the display panel; wherein a pitch between adjacent photosensitive units is N times the minimum distance between the adjacent photosensitive units, N being an integer greater than or equal to 2; and the pitch between adjacent photosensitive units is an integral multiple of the offset distance, wherein the pitch between the adjacent photosensitive units is a distance between center points of the adjacent photosensitive units; the method comprising:
   determining a movement route of the display panel based on a size relationship between the optical detection apparatus and the display panel;
   controlling the optical detection apparatus to acquire screen information of the display panel at a first position;
   controlling the display panel to move along the movement route, and controlling the optical detection apparatus to acquire screen information of the display panel again every time the display panel moves a first distance, until the respective acquired screen information collectively embodies a complete screen of the display panel; and
   performing optical detection on the display panel based on each of the acquired screen information.

12. The method according to claim 11, wherein determining the movement route of the display panel based on the size relationship between the optical detection apparatus and the display panel comprises:
   if a length of one row of photosensitive units in the optical detection apparatus is not less than a length of a first side of the display panel, determining a route of a linear movement along an extension direction of a second side of the display panel as the movement route, wherein the first side and the second side are perpendicular to each other.

13. The method according to claim 12, wherein determining the movement route of the display panel based on the size relationship between the optical detection apparatus and the display panel further comprises:
   if the length of one row of photosensitive units in the optical detection apparatus is less than a length of any side of the display panel, determining an S-shaped route as the movement route, wherein a starting point of the S-shaped route is a position of the display panel when a first corner of the display panel is covered by the optical detection apparatus, and an ending point of the S-shaped route is a position of the display panel when a second corner of the display panel is covered by the optical detection apparatus, the first corner and the second corner being two different corners of the display panel.

14. The method according to claim 11, wherein performing the optical detection on the display panel based on each of the acquired screen information comprises:
determining a corresponding relationship between each of the screen information and the display panel based on each of the acquired screen information;
calculating optical data at a corresponding position of the display panel in combination with each of the screen information based on the corresponding relationship between each of the screen information and the display panel; and
completing the optical detection on the display panel based on the optical data at the corresponding position of the display panel.

15. The method according to claim 14, wherein calculating the optical data at the corresponding position of the display panel in combination with each of the screen information based on the corresponding relationship between each of the screen information and the display panel comprises:
determining a number of subdivided regions corresponding to the photosensitive units based on a relationship between the first distance and a size of the photosensitive unit; and
calculating the optical data at the corresponding position of the display panel in combination with each of the screen information based on the number of the subdivided regions.

16. The method according to claim 11, wherein the first distance is less than the sub-pixel size of the display panel.

17. A computer device, comprising a processor and a memory, wherein
the memory is configured to store a software program; and
the processor runs or executes the software program stored in the memory to cause the computer device to perform a method for detecting a display panel by using an optical detection apparatus; the optical detection apparatus comprising photosensitive units arranged in an array, wherein a minimum distance between adjacent photosensitive units is less than a sub-pixel size of the display panel, and the photosensitive units in adjacent rows have a position offset in a first direction, an offset distance corresponding to the position offset being less than the sub-pixel size of the display panel; wherein a pitch between adjacent photosensitive units is N times the minimum distance between the adjacent photosensitive units, N being an integer greater than or equal to 2; and the pitch between adjacent photosensitive units is an integral multiple of the offset distance, wherein the pitch between the adjacent photosensitive units is a distance between center points of the adjacent photosensitive units;
wherein the method comprises:
determining a movement route of the display panel based on a size relationship between the optical detection apparatus and the display panel;
controlling the optical detection apparatus to acquire screen information of the display panel at a first position;
controlling the display panel to move along the movement route, and controlling the optical detection apparatus to acquire screen information of the display panel again every time the display panel moves a first distance, until the respective acquired screen information collectively embodies a complete screen of the display panel; and
performing optical detection on the display panel based on each of the acquired screen information.

18. A computer-readable storage medium, comprising at least one program code stored therein, wherein the at least one program code is loaded and executed by a processor to perform the method as defined in claim 11.

19. A computer program, comprising: at least one computer program code, wherein the at least one program code comprises instructions for performing the method as defined in claim 11.

* * * * *